April 12, 1949.  Z. C. BIRNBERG  2,467,075
GOLF BAG VEHICLE
Filed June 12, 1946
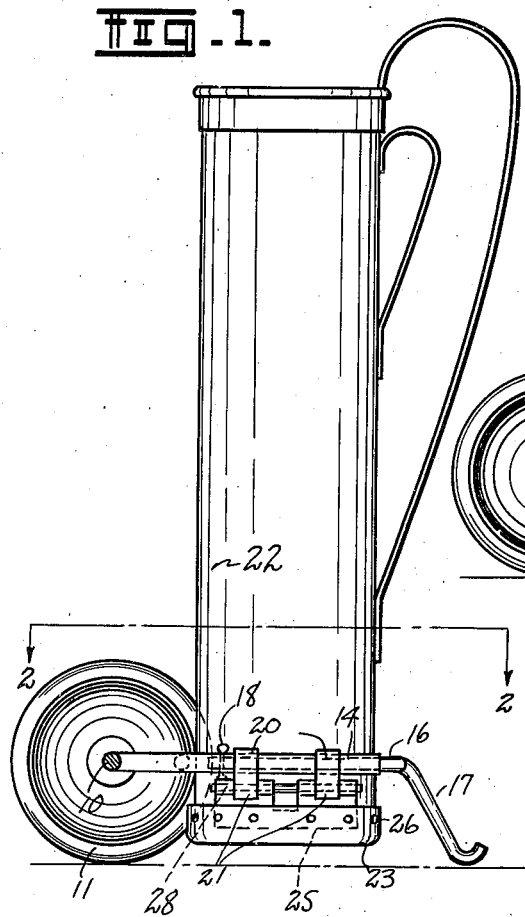
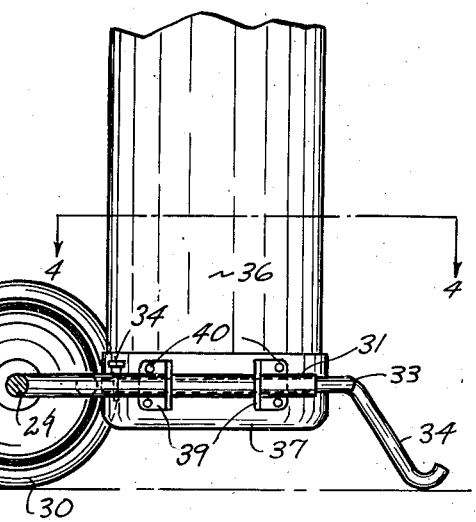
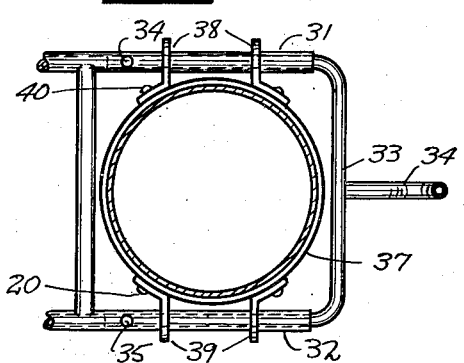
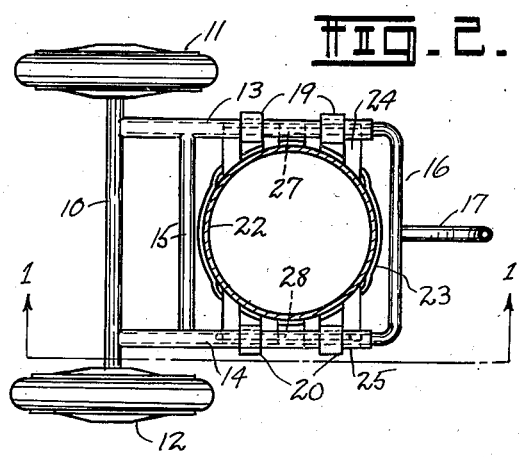
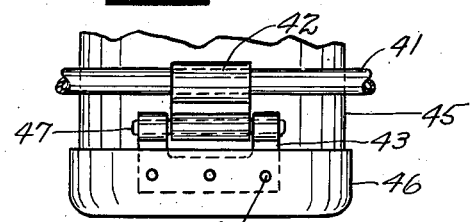
INVENTOR.
Zingel C. Birnberg.
BY
W. B. Harpman
ATTORNEY.

Patented Apr. 12, 1949

2,467,075

UNITED STATES PATENT OFFICE 2,467,075

GOLF BAG VEHICLE

Zingel C. Birnberg, Youngstown, Ohio

Application June 12, 1946, Serial No. 676,137

3 Claims. (Cl. 280—51)

This invention relates to a golf bag vehicle and more specifically to a vehicle adapted to support and carry a golf bag positioned therein.

The principal object of the invention is the provision of a golf bag vehicle incorporating means for carrying a golf bag as a structural portion of the vehicle.

A further object of the invention is the provision of a golf bag vehicle adapted to receive and support a golf bag having attachment means positioned thereon.

A still further object of the invention is the provision of a golf bag vehicle comprising a two-part frame construction, one part of which telescopically engages the other to facilitate the positioning of a golf bag on the said vehicle.

A still further object of the invention is the provision of an integrally formed golf bag vehicle including removable hinge-like portions for engaging supporting members affixed to the golf bag.

The golf bag vehicle shown and described herein has been designed to form a lightweight, simply constructed device which may be readily and simply affixed to a golf bag to enable it to be propelled about a golf course by a golfer, the vehicle serving to carry the majority of the weight of the golf bag, and, in addition, to serve as a stand for the golf bag at such times as desired. The vehicle itself comprises only frame and wheel members, the golf bag being positioned in the frame members by means attached to the golf bag so that in actual practice the golf bag becomes a structural portion of the vehicle at such time as it is positioned therein.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation with parts in cross section illustrating a golf bag vehicle and golf bag positioned therein.

Figure 2 is a horizontal cross section taken on line 2—2 of Figure 1. Line 1—1 on Figure 2 indicates the view illustrated in Figure 1.

Figure 3 is an enlarged detail of a modified form of attachment between a golf bag and golf bag vehicle.

Figure 4 is a horizontal cross section taken on line 4—4 of Figure 3.

Figure 5 is an enlarged detail of a further modification of an attachment means for a golf bag and the golf bag vehicle.

By referring to the drawings and Figures 1 and 2 in particular, it will be seen that the golf bag vehicle comprises an axle 10 having a pair of ground engaging wheels 11 and 12 positioned on the outermost ends of the axle 10 by conventional means. The axle 10 is provided with a horizontally extending frame comprising a pair of frame members 13 and 14 spaced with respect to one another by means of a transversely positioned cross member 15. The outermost ends of the frame members 13 and 14 are united by a U-shaped, secondary frame member 16 which has a downwardly depending leg 17 affixed thereto midway thereof. The arms of the U-shaped secondary frame member 16 telescopically engage the frame members 13 and 14 of the golf bag vehicle. The secondary frame member 16 may be permanently attached to the frame members 13 and 14 as by riveting or welding the same thereto in assembled position. Fastening means comprising a removable cotter pin is illustrated in Figures 1 and 2 of the drawings and indicated by the numeral 18.

Prior to the assembly of the component parts of the frame, two pairs of eyelets 19 and 20, respectively, are positioned one pair upon each of the horizontal frame members 13 and 14, the eyelets 19 and 20 having depending portions forming secondary eyelets 21 adapted to form component parts of a hinge structure, the other portions of which are attached as by means of rivets to a golf bag.

In Figures 1 and 2 of the drawings the golf bag is indicated by the numeral 22 and the upwardly flanged bottom portion of the golf bag is indicated by the numeral 23. As is customary in golf bag constructions, this upwardly flanged bottom portion is riveted to the cylindrical body member of the golf bag 22. In the present disclosure a pair of oppositely disposed hinged sections 24 and 25 are affixed to the golf bag by the rivets uniting the upwardly flanged bottom 23 to the body of the golf bag 22. It will be obvious that these hinge sections 24 and 25 may be affixed to the golf bag 22 at the time of its manufacture and they may be affixed at any time thereafter by removing some of the original rivets and affixing the hinged sections by the installation of new rivets. In Figures 1 and 2 the rivets are indicated by the numeral 26.

It will thus be seen that when the golf bag vehicle is assembled with the eyelets 19 and 20 positioned on the horizontal frame members 13 and 14 and the golf bag 22 positioned in the area defined by the golf bag vehicle frame, the hinged sections 25 on the golf bag will register with the secondary eyelets 21 on the eyelets 19 and 20 so that a pair of hinge pins, indicated by the numerals 27 and 28, may be engaged to complete the structural connection between the hinged sections 25 affixed to the golf bag 22 and the frame of the golf bag vehicle. It will be observed by referring to Figure 1 of the drawings that this construction positions the bottom 23 of the golf bag 22 in underslung relation to the horizontal portions of the frame of the golf bag vehicle which lends stability to the golf bag vehicle and the golf bag carried thereby when the same is at rest. It also provides a more desirable center of gravity at such time as the vehicle is in use and the golf bag and frame portion of the vehicle tilted with respect to the axle 10 and the wheels 11 thereof.

It will be obvious to those skilled in the art that modifications in the structure disclosed can be made and particularly in the method of affixing the golf bag in the frame of the vehicle. Two such modifications are disclosed and the first of these may be seen by referring to Figures 3 and 4 of the drawings.

In Figures 3 and 4 of the drawings an axle of a golf bag vehicle is indicated by the numeral 29, ground engaging wheels by the numeral 30 and the horizontal frame members by the numerals 31 and 32. A secondary U-shaped frame member is indicated by the numeral 33 and a depending leg by the numeral 34. The secondary U-shaped frame 33 is telescopically engaged in the tubular sections of the horizontal frame members 31 and 32 and held therein by means of removable pins 34 and 35.

In Figures 3 and 4 of the drawings a golf bag 36 with a bottom portion 37 is shown provided with two pairs of brackets 38 and 39 riveted as by means of rivets 40 to the bottom portion 37 of the golf bag 36. The brackets 38 and 39 have out-turned portions having openings therein through which the horizontal frame members 31 and 32 are positioned thus supporting the golf bag on the horizontal frame members 31 and 32 of the golf bag vehicle.

It will be seen that when it is desired to use the golf bag without the golf bag vehicle, the pins 34 and 35 may be removed, the secondary frame 33 disengaged from its normal position from the frame members 31 and 32, and the golf bag and its brackets 38 and 39 slid (to the right in Figures 3 and 4) out of engagement with the horizontal frame members 31 and 32.

By referring to Figure 5 of the drawings, the second of the two modifications of the invention may be seen. It will be seen that the horizontal frame members are indicated by the numeral 41 in Figure 5, that a hinge member having an eyelet 42 therein is positioned on each of the horizontal frame members 41, and that a secondary hinge member 43 is affixed by means of rivets 44 to a golf bag 45 having an upwardly flanged bottom portion 46. A hinge pin 47 serves to unite the hinge member 43 with the hinge member having the eyelet 42 therein, thus providing for the underslung positioning of the golf bag 45 between the horizontal frame members 41. This form of the modification of the invention is similar to that shown in Figures 1 and 2 of the drawings with the exception that but one pair of frame engaging eyelet members are employed whereas in the form of invention illustrated in Figure 1, and heretofore described, two pairs of such members were disclosed.

It will thus be seen that a simple and efficient golf bag vehicle has been disclosed which may be economically formed and hence widely distributed at a relatively low cost and which will suitably carry a golf bag when the same is provided with the necessary attachment means and positioned in the frame of the vehicle. It will also be seen that the golf bag vehicle may be formed of lightweight tubular material and that it may be taken apart thus making it readily portable.

Having thus described my invention, what I claim is:

1. The combination of a golf bag vehicle comprising an axle having ground engaging wheels positioned thereon, a pair of horizontally positioned frame members affixed to said axle at right angles thereto and spaced with respect to one another, a U-shaped frame member, the arms of which telescopically engage and are removably affixed to the said spaced horizontally positioned frame members and a ground engaging leg positioned on the said U-shaped frame member; and a golf bag having brackets on its opposite sides, means hinged to said brackets engaging said horizontally positioned frame members.

2. The combination of a golf bag vehicle and a golf bag, the golf bag vehicle comprising an axle having ground engaging wheels thereon, a pair of spaced frame members affixed to the axle at right angles thereto, a U-shaped frame member having its arms telescopically engaging the said pair of spaced frame members and removably secured thereto and a ground engaging leg affixed to the said U-shaped frame member, the golf bag comprising a receptacle having oppositely disposed brackets affixed thereto, eyelet members hinged to the said brackets and the said eyelet members engageable with the said pair of frame members of the golf bag vehicle for positioning and supporting the golf bag in the said vehicle.

3. The combination of a golf bag vehicle and a golf bag, the golf bag vehicle comprising an axle having ground engaging wheels thereon, a pair of spaced frame members affixed to the axle at right angles thereto, a U-shaped frame member the arms of which register in and are affixed to the said pair of spaced frame members and a ground engaging leg affixed to the base of the said U-shaped frame member, the golf bag comprising a receptacle having oppositely disposed brackets affixed thereto, eyelet members hinged to the said brackets and the said eyelet members engageable with the said pair of frame members of the golf bag vehicle for positioning and supporting the golf bag in the said vehicle.

ZINGEL C. BIRNBERG.

REFERENCES CITED

The following references are of record in the file of this patent:

UNITED STATES PATENTS

| Number | Name | Date |
| --- | --- | --- |
| 492,928 | Laird | Feb. 21, 1893 |
| 570,444 | Armstrong | Nov. 3, 1896 |
| 1,231,030 | Kelley | June 26, 1917 |
| 1,374,986 | Carter | Apr. 19, 1921 |
| 1,744,414 | Pflaum | Jan. 21, 1930 |
| 2,040,339 | Ross | May 12, 1936 |
| 2,405,674 | Schliwa et al. | Aug. 13, 1946 |